United States Patent
Chen et al.

(10) Patent No.: US 7,633,713 B2
(45) Date of Patent: Dec. 15, 2009

(54) METHOD FOR CONTROLLING THE FORMATION OF THE TRAILING SHIELD GAP DURING PERPENDICULAR HEAD FABRICATION AND HEAD FORMED THEREBY

(75) Inventors: Tsung Y. Chen, San Jose, CA (US); Yinshi Liu, Foster City, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 780 days.

(21) Appl. No.: 11/047,965

(22) Filed: Jan. 31, 2005

(65) Prior Publication Data

US 2006/0171067 A1    Aug. 3, 2006

(51) Int. Cl.
G11B 5/147 (2006.01)
G11B 5/127 (2006.01)

(52) U.S. Cl. .............. 360/125.12; 29/603.01

(58) Field of Classification Search ........... 360/119.03, 360/125.52, 125.39, 125.29, 125.3, 123.09, 360/119.04, 125.24, 125.26, 319, 125.12–125.15
See application file for complete search history.

(56) References Cited

U.S. PATENT DOCUMENTS

| | | | |
|---|---|---|---|
| 6,183,349 B1 | 2/2001 | Burga et al. | |
| 6,226,151 B1 | 5/2001 | Haddock | |
| 6,267,645 B1 | 7/2001 | Burga et al. | |
| 6,296,552 B1 | 10/2001 | Boutaghou et al. | |
| 6,301,077 B1 | 10/2001 | Sasaki | |
| 6,493,185 B1 | 12/2002 | Dorius et al. | |
| 6,605,196 B2 | 8/2003 | Sasaki | |
| 6,707,631 B1 | 3/2004 | Haddock | |
| 6,751,071 B2 | 6/2004 | Yazawa et al. | |
| 6,757,141 B2 | 6/2004 | Santini et al. | |
| 7,120,988 B2 * | 10/2006 | Le et al. .................. | 29/603.07 |
| 2002/0029448 A1 | 3/2002 | Duan et al. | |
| 2002/0031987 A1 | 3/2002 | Liners et al. | |
| 2002/0039876 A1 | 4/2002 | Ekstrum et al. | |
| 2002/0051330 A1 | 5/2002 | Heijden et al. | |
| 2002/0129900 A1 | 9/2002 | Yoshioka et al. | |
| 2002/0145834 A1 | 10/2002 | Inoue et al. | |
| 2002/0159200 A1 | 10/2002 | Ju et al. | |
| 2002/0162204 A1 | 11/2002 | Lee et al. | |
| 2003/0184916 A1 | 10/2003 | Hanchi et al. | |
| 2004/0082277 A1 | 4/2004 | Smith | |
| 2004/0161636 A1 * | 8/2004 | Hujanen et al. ............. | 428/692 |
| 2004/0179296 A1 | 9/2004 | Sato | |
| 2004/0184190 A1 | 9/2004 | Han et al. | |
| 2004/0207959 A1 | 10/2004 | Saito | |
| 2004/0218312 A1 | 11/2004 | Matono | |

* cited by examiner

*Primary Examiner*—David D Davis
(74) *Attorney, Agent, or Firm*—Merchant & Gould

(57) ABSTRACT

A method for controlling the formation of the trailing shield gap during perpendicular head fabrication and head formed thereby are disclosed. The in-situ trailing shield gap deposition process removes the pre-sputter process that can damage the write pole material. Further, a seed pre-layer is formed on top of the trailing shield gap to absorb any non-uniformity of the trailing shield gap and to control issues resulting from the pre-sputter process originating from the trailing shield seed deposition.

7 Claims, 9 Drawing Sheets

METHOD FOR CONTROLLING THE FORMATION OF THE TRAILING SHIELD GAP DURING PERPENDICULAR HEAD FABRICATION AND HEAD FORMED THEREBY

BACKGROUND OF THE INVENTION

1. Field of the Invention

This disclosure relates in general to magnetic storage systems, and more particularly to a method for controlling the formation of the trailing shield gap during perpendicular head fabrication and head formed thereby.

2. Description of Related Art

Disk drives are used as primary data storage devices in modern computer systems and networks. A typical disk drive comprises one or more rigid magnetizable storage disks, which are rotated by a spindle motor at a high speed. An array of read/write heads transfer data between tracks of the disks and a host computer. The heads are mounted to an actuator assembly that is positioned so as to place a particular head adjacent the desired track.

Information is written on each disk in a plurality of concentric tracks by a transducer assembly mounted on an actuator arm. Typically, the transducer assembly is suspended over the disk from the actuator arm in a slider assembly, which includes air bearing surfaces designed to interact with a thin layer of moving air generated by the rotation of the disks. Transducer assemblies are said to "fly" over the disk surface as the disk rotates. To access tracks on the disk, the actuator arm moves in an arc across the disk. The physical distance between the nominal centers of two adjacent tracks is referred to as the "track pitch". The track pitch and linear track density define the storage capacity of the disk.

Each of the disks is coated with a magnetizable medium wherein the data is retained as a series of magnetic domains of selected orientation. The data are imparted to the data disk by a write element of the corresponding head. The data thus stored to the disk are subsequently detected by a read element of the head. Although a variety of head constructions have been utilized historically, magneto-resistive (MR) heads are typically used in present generation disk drives. An MR head writer uses a thin-film inductive coil arranged about a ferromagnetic core having a write gap. As write currents are passed through the coil, a magnetic write field is established emanating magnetic flux lines from the core and fringing across the write gap. The flux lines extend into the magnetizable medium to establish magnetization vectors in selected directions, or polarities, along the track on the data disk. Magnetic flux transitions are established at boundaries between adjacent magnetization vectors of opposite polarities.

To write a computer file to disk, the disk drive receives the file from the host computer in the form of input data that are buffered by an interface circuit. A write channel encodes and serializes the data to generate a data input stream that can be represented as a square-wave type signal of various lengths between rising and falling signal transitions.

A write driver circuit uses the data input stream to generate a write current which is applied to the write head, creating the magnetic write field that writes the encoded data to the magnetizable medium of the selected disk. The write current both reverses the polarity of the magnetic write field, creating the magnetic flux transitions, and sustains a given polarity between successive magnetic flux transitions.

A write head typically employs two ferromagnetic poles capable of carrying flux signals for the purpose of writing the magnetic impressions into the track of a magnetic disk or tape. The poles are fabricated on a slider with the pole tips located at the air bearing surface. Processing circuitry digitally energizes the write coil that induces flux signals into the poles. The flux signals bridge across the write gap at the air bearing surface so as to write the magnetic information into the track of the rotating disk. The thinner the thickness of the write gap layer, the greater the number of bits the write head can write into the track.

A write head is typically rated by its areal density that is a product of its linear bit density and its track width density. The linear bit density is the number of bits that can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). As discussed hereinabove, the linear bit density depends upon the thickness of the write gap layer. The track width density is directly dependent upon the width of the second pole tip at the ABS. Efforts over the years to increase the areal density of write heads have resulted in computer storage capacities increasing from kilobytes to megabytes to gigabytes.

For the past 40 years, longitudinal recording has been used to record information on a disc drive. In longitudinal recording, the magnetization in the bits on a disc is flipped between lying parallel and anti-parallel to the direction in which the head is moving relative to the disc. In longitudinal recording, the magnetic medium on the disc is magnetized parallel to the surface of the disc.

In conventional longitudinal magnetic recording systems, as areal densities approach increase, thermal stability (the degradation of written information due to thermal fluctuations), SNR (Signal-To-Noise Ratio) and writeability requirements become increasingly more difficult to meet. Perpendicular recording is considered as one of the possibilities to achieve ultrahigh areal densities beyond conventional longitudinal recording. In perpendicular recording, the medium is magnetized perpendicular to the surface of the disk. According to perpendicular magnetic recording, a recording (write) magnetic field generated from a main pole of the head forms a magnetic path in which the magnetic field is induced to the underlayer disposed on the rear of the recording magnetic layer and returned from an auxiliary pole to the recording head. By switching the direction of recording magnetic field, the recording magnetic layer is magnetized in two directions towards the thickness of the medium in correspondence with the recording information code, thereby storing information. In such recording, an intensive and steep perpendicular recording (write) magnetic field can be applied to the recording magnetic layer, so that high-resolution information storage can be achieved.

The trailing shield gap on perpendicular heads is typically thin and therefore accurate and reliable control of the formation of the gap is hard to control. The conventional method of ex-situ deposition runs into two areas of controllability problems. First, the write pole material thickness is affected by the ex-situ deposition method. For example, during deposition of gap, the pre-sputter material used for adhesion and the process of cleaning the surface removes the underlying write pole material. Thus, the resulting thickness of the gap layer may be non-uniform or not repeatable.

Secondly, the gap itself may be affected by the seed layer used to plate the trailing shield. During seed layer deposition, the pre-sputter material may affect the gap, causing thickness and uniformity control issues.

It can be seen then that there is a need for a method for controlling the formation of the trailing shield gap during perpendicular head fabrication and head formed thereby.

SUMMARY OF THE INVENTION

To overcome the limitations described above, and to overcome other limitations that will become apparent upon reading and understanding the present specification, the present invention discloses a method for controlling the formation of the trailing shield gap during perpendicular head fabrication and head formed thereby.

The present invention solves the above-described problems by using an in-situ trailing shield gap deposition process. The in-situ trailing shield gap deposition process removes the pre-sputter process that can damage the write pole material. Further, a seed pre-layer is formed on top of the trailing shield gap to absorb any non-uniformity of the trailing shield gap and to control issues resulting from the pre-sputter process originating from the trailing shield seed deposition.

A method for controlling the formation of the trailing shield gap during perpendicular head fabrication in accordance with the principles of an embodiment of the present invention includes forming a laminate write pole, forming a trailing gap layer that includes non-magnetic metal materials in-situ with the laminate write pole, trimming the trailing shield gap layer and laminate write pole are trimmed, forming a filler material at the sides of the trimmed trailing shield gap layer and laminate write pole, forming a seed pre-layer over the filler, the trailing shield gap layer and laminate write pole and forming a trailing shield over the seed pre-layer.

In another embodiment of the present invention, a perpendicular write head is provided. The perpendicular write head includes a write pole, a trailing shield gap layer formed over the write pole, the trailing shield gap layer being formed in-situ with the write pole, the write pole and trailing shield gap being trimmed to a predetermined shape, a filler layer disposed at the sides of the trimmed write pole and trailing shield gap, a seed layer disposed over the filler layer and the trailing shield gap and a trailing shield formed over the seed layer.

In another embodiment of the present invention, a data storage system is provided. The data storage system includes a translatable recording medium for storing data thereon, a motor for translating the recording medium, a transducer disposed proximate the recording medium for reading and writing data on the recording medium and an actuator, coupled to the transducer, for moving the transducer relative to the recording medium, wherein the transducer comprises a perpendicular write head, the perpendicular write head further includes a write pole, a trailing shield gap layer formed over the write pole, the trailing shield gap layer being formed in-situ with the write pole, the write pole and trailing shield gap being trimmed to a predetermined shape, a filler layer disposed at the sides of the trimmed write pole and trailing shield gap, a seed layer disposed over the filler layer and the trailing shield gap and a trailing shield formed over the seed layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method for controlling the formation of the trailing shield gap during perpendicular head fabrication and head formed thereby. The present invention provides an in-situ trailing shield gap deposition process that removes the pre-sputter process, which can damage the write pole material. Further, a seed pre-layer is formed on top of the trailing shield gap to absorb any non-uniformity of the trailing shield gap and to control issues resulting from the pre-sputter process originating from the trailing shield seed deposition.

Figure 1:
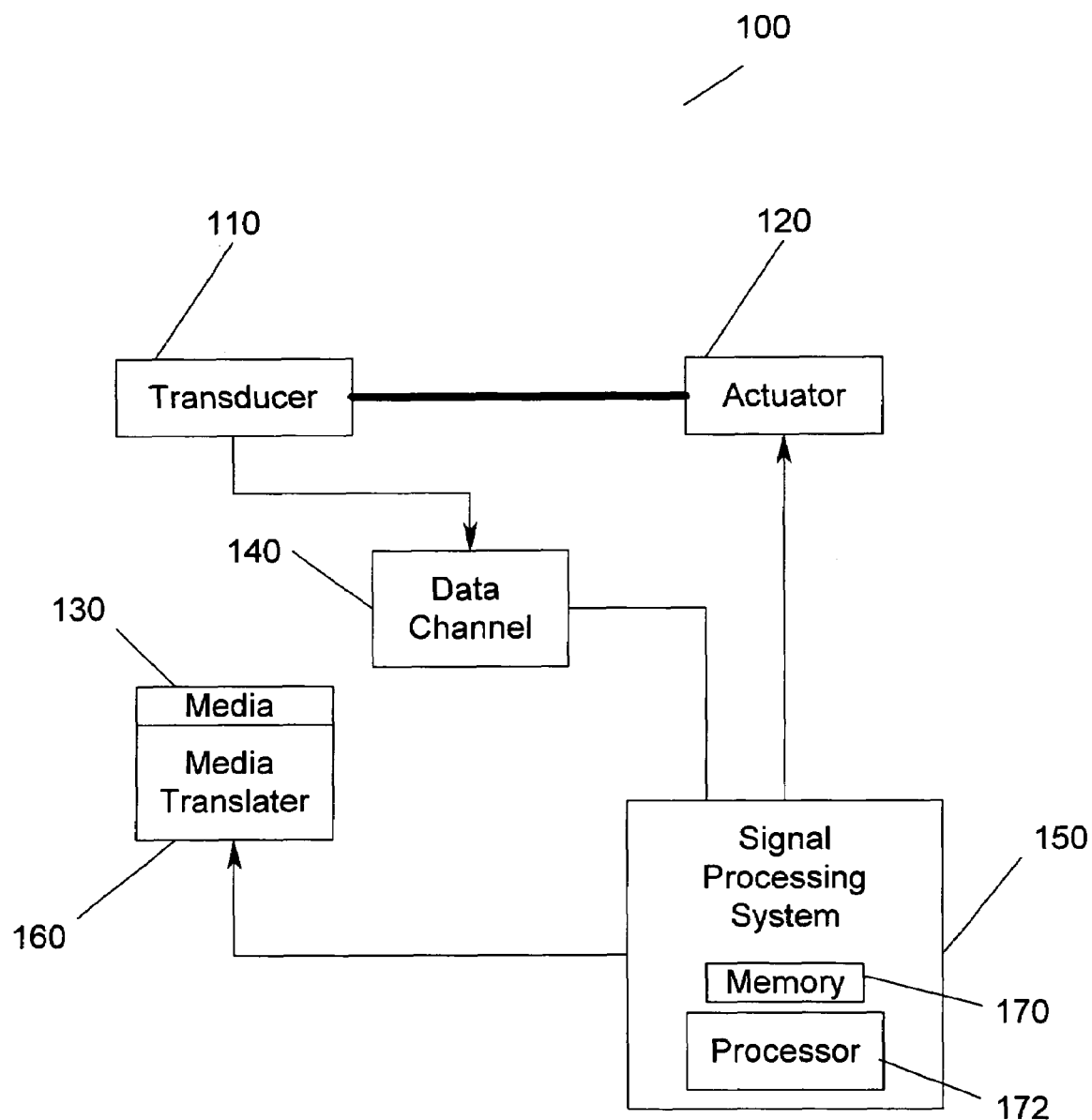
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
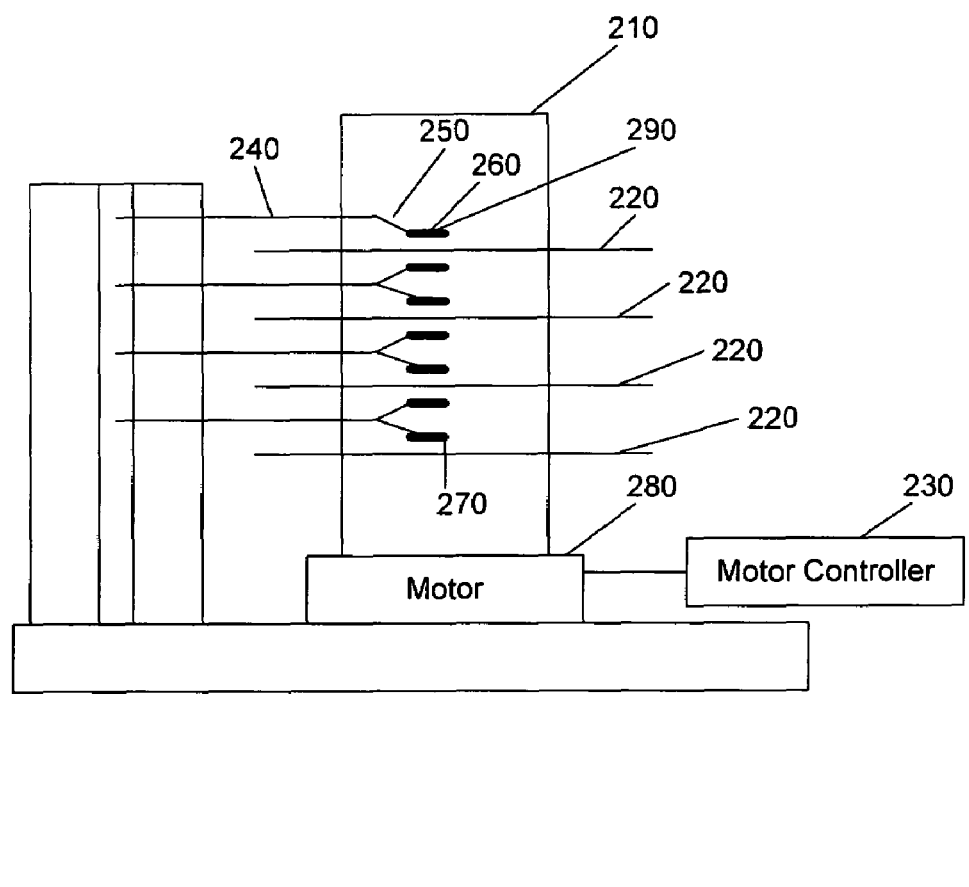
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 240 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
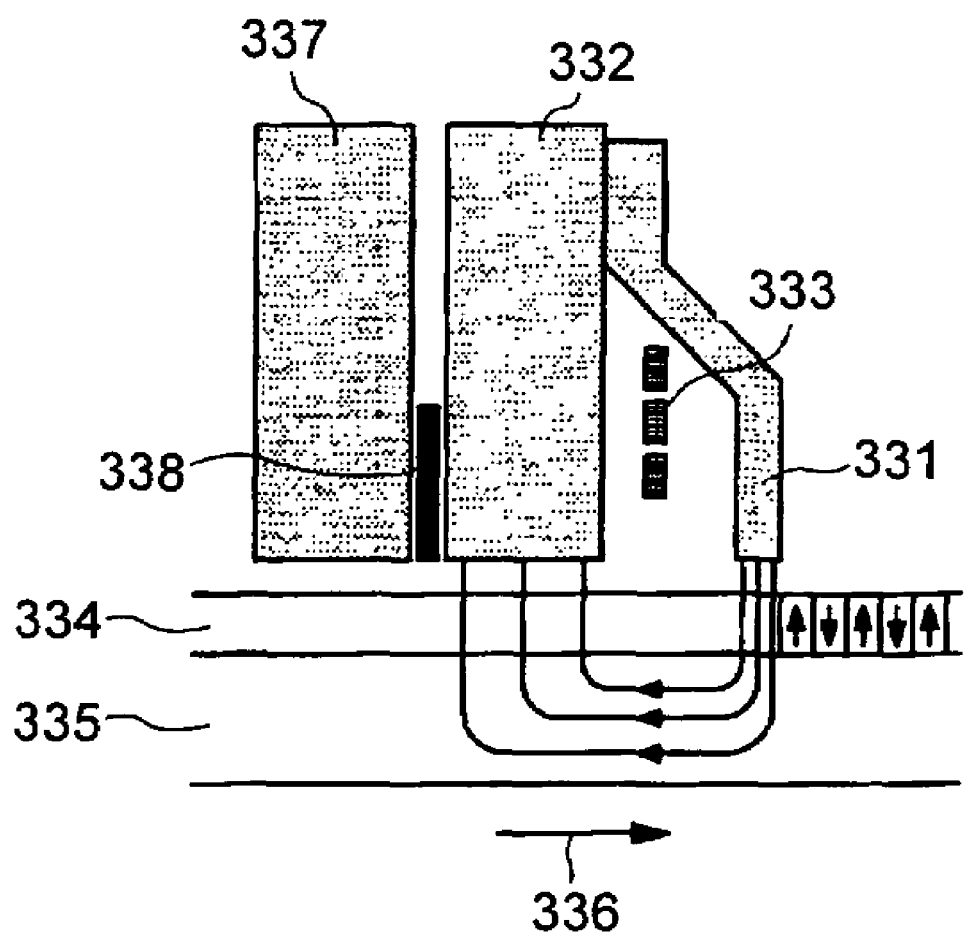
FIG. 3 is a schematic diagram showing the flow of a magnetic flux in the process of recording with a magnetic disk for perpendicular recording according to an embodiment of the present invention.

FIG. 3 is a schematic diagram 300 showing the flow of a magnetic flux between the head and medium in the perpendicular recording process. A recording (writing) head which is composed of a main pole 331, an auxiliary pole 332 and a coil 333 is facing a perpendicular recording medium having a recording layer 334 and a soft magnetic under layer 335. As a current is applied to excite the coil 333, a magnetic field is perpendicularly generated between the tip of the main pole and the soft magnetic under layer 335 so that recording is made in the recording layer 334 of the perpendicular recording medium. The magnetic flux which has reached the soft magnetic under layer 335 goes back to the auxiliary pole 332, making up a magnetic circuit. The recording magnetic field distribution depends on the shape of the main pole. It can be understood from the figure that writing is made through the main pole's end, which is on the trailing side in the medium moving direction 336. On the other hand, reading is made through a magnetoresistive effect element 338 located between the auxiliary pole 332 and a bottom shield 337.

As can be seen in FIG. 3 then, for a conventional single pole writer 300, the flux path is from the trailing edge of the write pole 331 to the soft underlayer 335 of the media and back to the return pole 332. The flux path takes the path of lowest reluctance and in this case it is the return pole 332. However, as described above, advantage may be observed by flying a longitudinal head backward due to the improvement in write field gradient.

Figure 4:
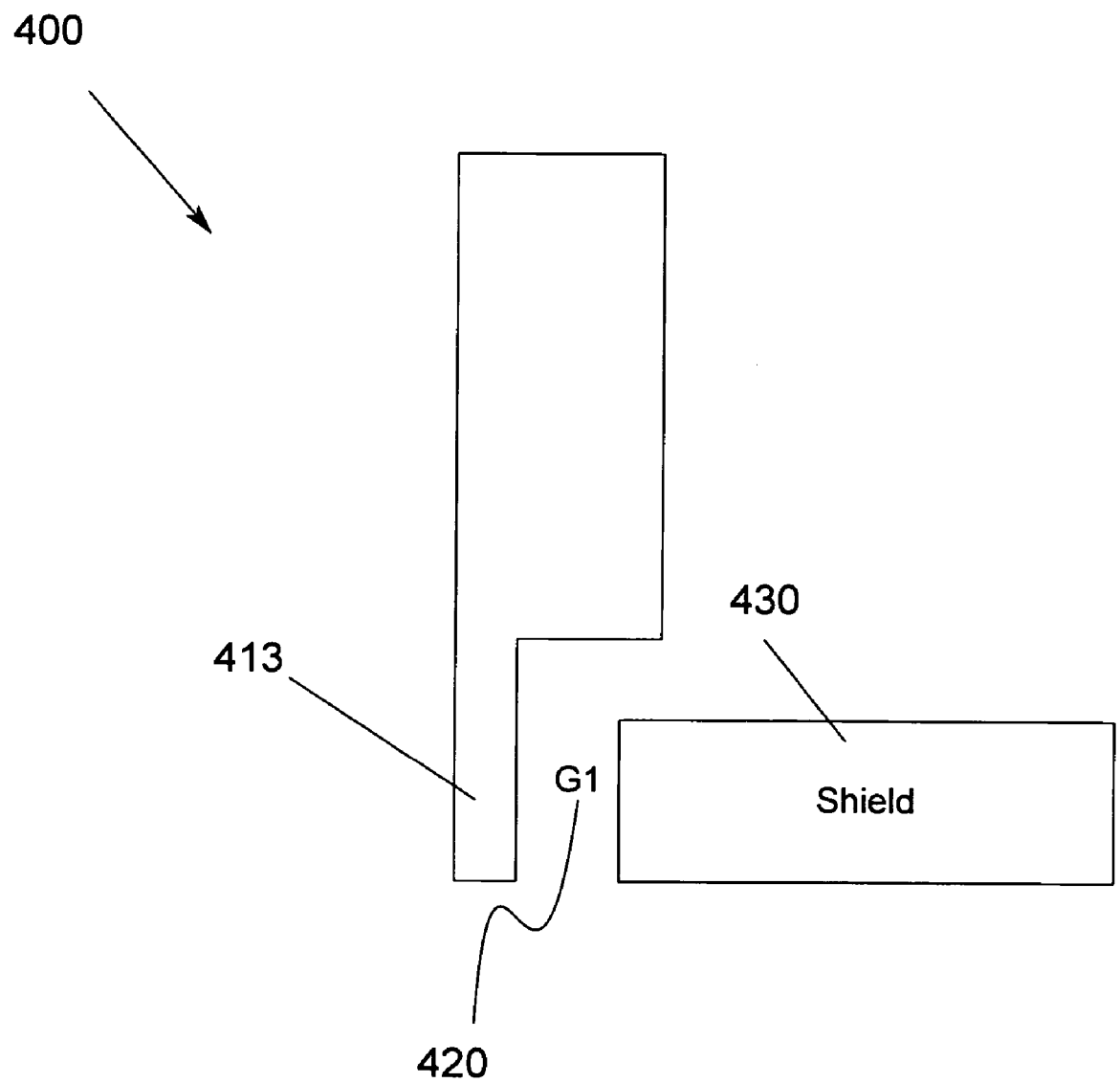
FIG. 4 illustrates a perpendicular recording head with a trailing shield according to an embodiment of the present invention.

FIG. 4 illustrates a perpendicular recording head with a trailing shield 400 according to an embodiment of the present invention. A pole tip 413 is disposed proximate to a trailing shield 430. A trailing shield gap 420 is formed at the trailing pole 413. However, the trailing shield gap 420 is typically thin and therefore accurate and reliable control of the formation of the gap is hard to control.

Figure 5:
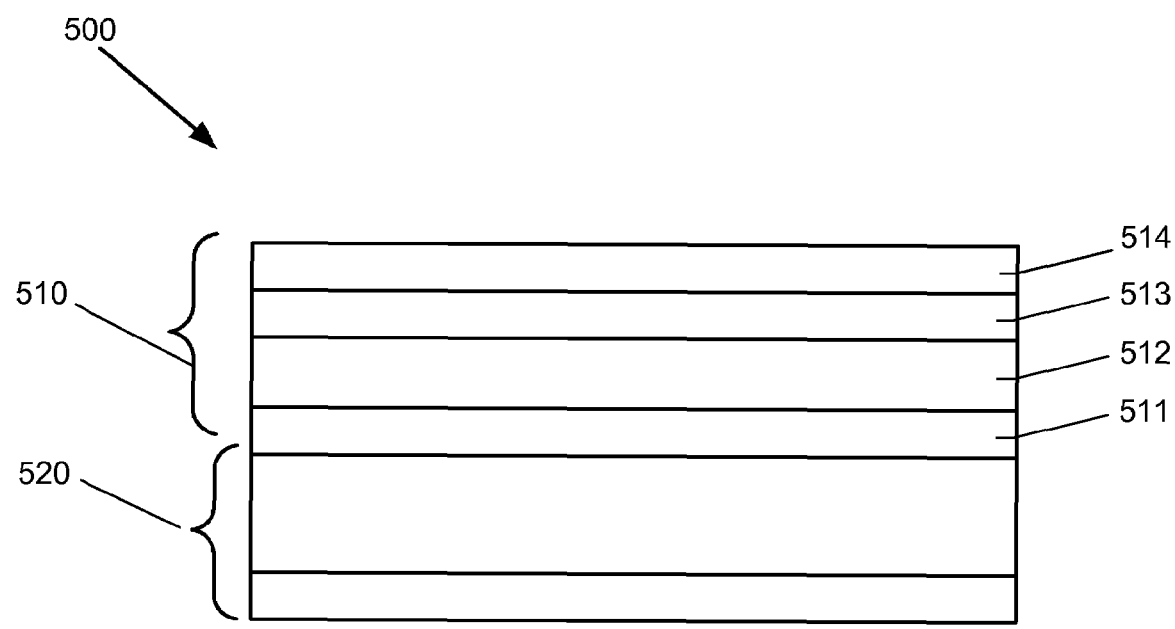
FIG. 5 illustrates a diagram showing a trailing shield gap and a laminate write pole formed according to an embodiment of the present invention.

FIG. 5 illustrates a diagram 500 showing a trailing shield gap 510 and a laminate write pole 520 formed according to an embodiment of the present invention. In FIG. 5, the laminate write pole 520 is formed. The trailing shield gap 510 is formed over the write pole 520. Typically, the formation of the trailing shield gap 510 involves first cleaning the surface of the write pole 520. However, the milling process for cleaning the write pole 520 removes some of the write pole material. Then, an adhesion layer for the trailing shield gap is sputtered. Because these processes do not scale to the dimensions needed, i.e., the deposition process results in a trailing shield gap layer 510 having a thickness that is not uniform and which is not repeatable. Still further, the trailing shield gap 510 may be affected by the seed layer used to plate the trailing shield. During seed layer deposition, the pre-sputter material may affect the trailing shield gap 510, causing thickness and uniformity control issues.

Figure 6:
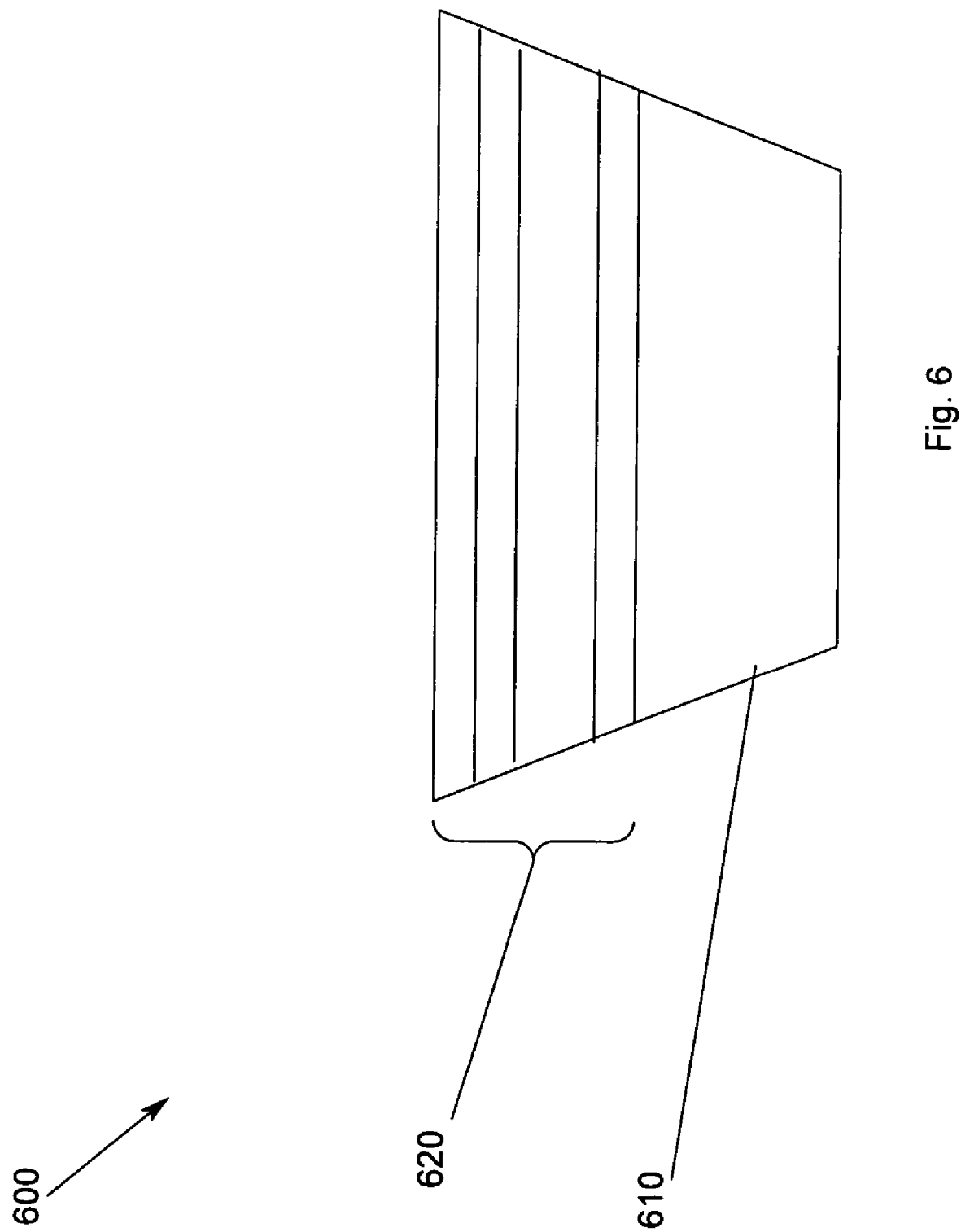
FIG. 6 is a diagram showing the write pole 610 and the trailing shield gap layer after trim according to an embodiment of the present invention.

In FIG. 5, the trailing shield gap 510 is included as a part of the deposition of the laminate 520, wherein the laminate 520 is formed and then the trailing shield gap 510 is formed in-situ so that the pre-sputter of the adhesion layer is not needed. Instead of using alumina for the gap material, a trailing shield gap layer 510 that includes non-magnetic metal materials is used. For example, a layer of tantalum 511 may be formed on the laminate first. The layer of tantalum 511 may have a thickness of about 10 nm. A layer of NiCr 512 may be formed over the tantalum layer 511. The NiCr layer 512 may have a thickness ranging from about 20-40 nm. A second layer of tantalum 513 may be formed on the NiCr layer 512. Again, the second layer of tantalum 513 may have a thickness of about 10 nm. Then, a layer of NiFe pre-layer 514 may be formed over the second tantalum layer 513. The NiFe pre-layer 513 may have a thickness of up to about 10 nm. Those skilled in the art will recognize that the present invention is not meant to be limited to the dimensions given here. FIG. 6 is a diagram 600 showing the write pole 610 and the trailing shield gap layer 620 after trim according to an embodiment of the present invention.

Figure 7:
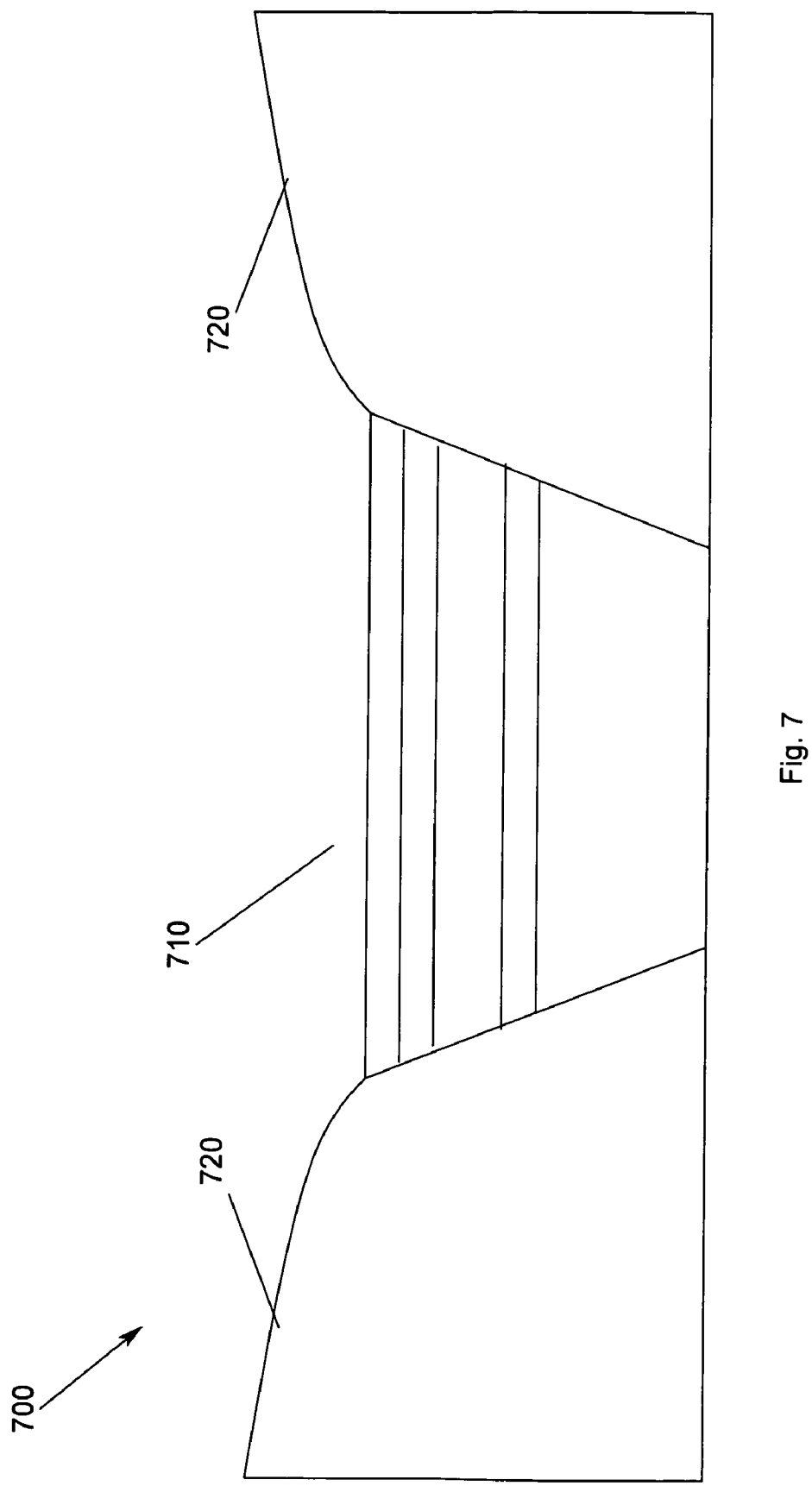
FIG. 7 is a diagram showing the write pole/trailing shield structure after refill has been performed according to an embodiment of the present invention.

FIG. 7 is a diagram 700 showing the write pole/trailing shield structure 710 after refill 720 has been performed according to an embodiment of the present invention. In FIG. 7, alumina 720 is deposited at the sides of the write pole/trailing shield structure 710.

Figure 8:
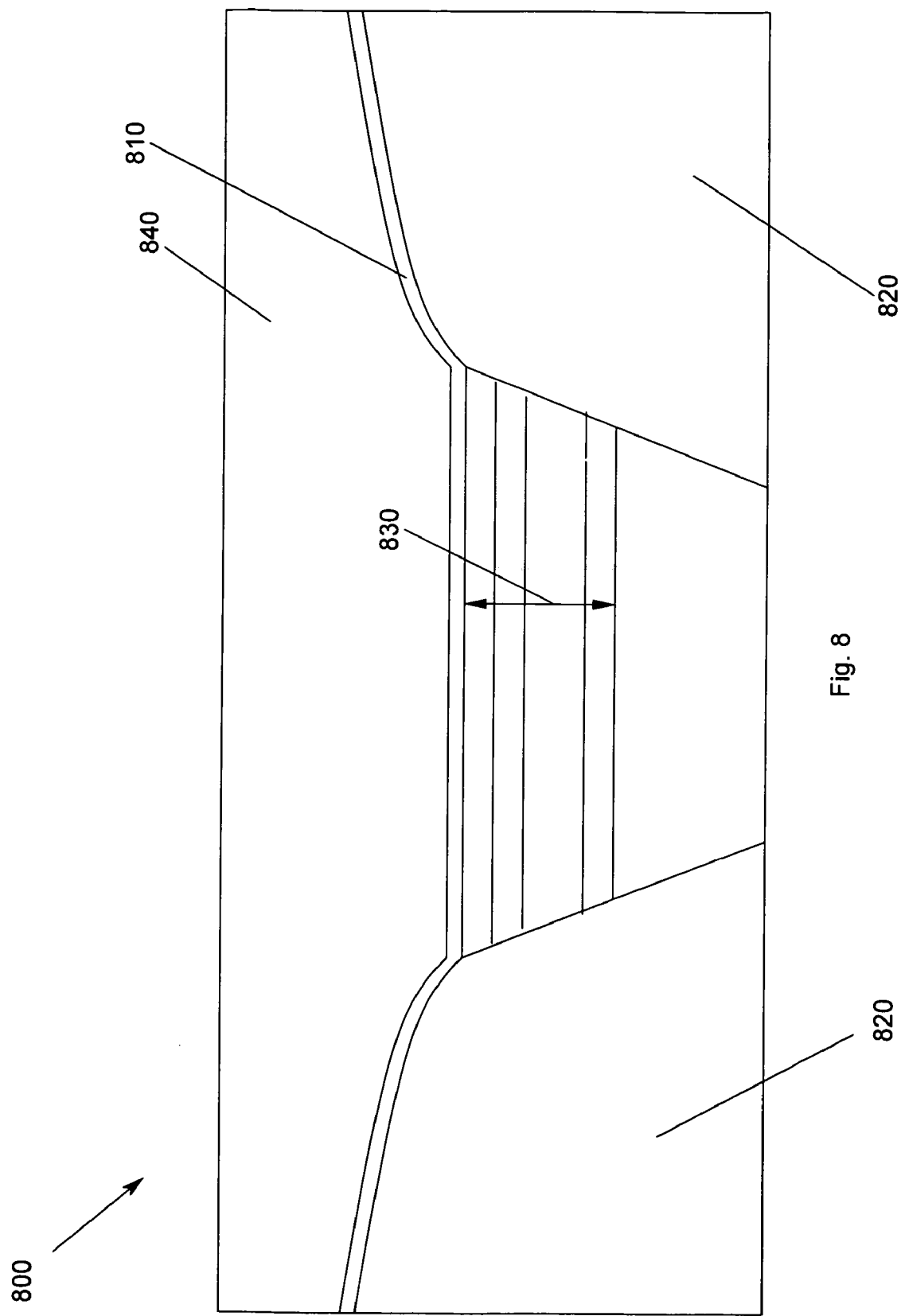
FIG. 8 illustrates the plating of the trailing shield according to an embodiment of the present invention.

FIG. 8 illustrates the plating of the trailing shield 800 according to an embodiment of the present invention. In FIG. 8, a seed layer 810 that conforms to the alumina filler 820 is deposited. The seed pre-layer 810 is also formed on top of the trailing shield gap 830. The seed pre-layer 810 absorbs the non-uniformity. The seed pre-layer 810 also controls the issues resulting from pre-sputter process involved in the trailing shield seed deposition. The trailing shield 840 is then formed over the seed pre-layer 810.

Figure 9:
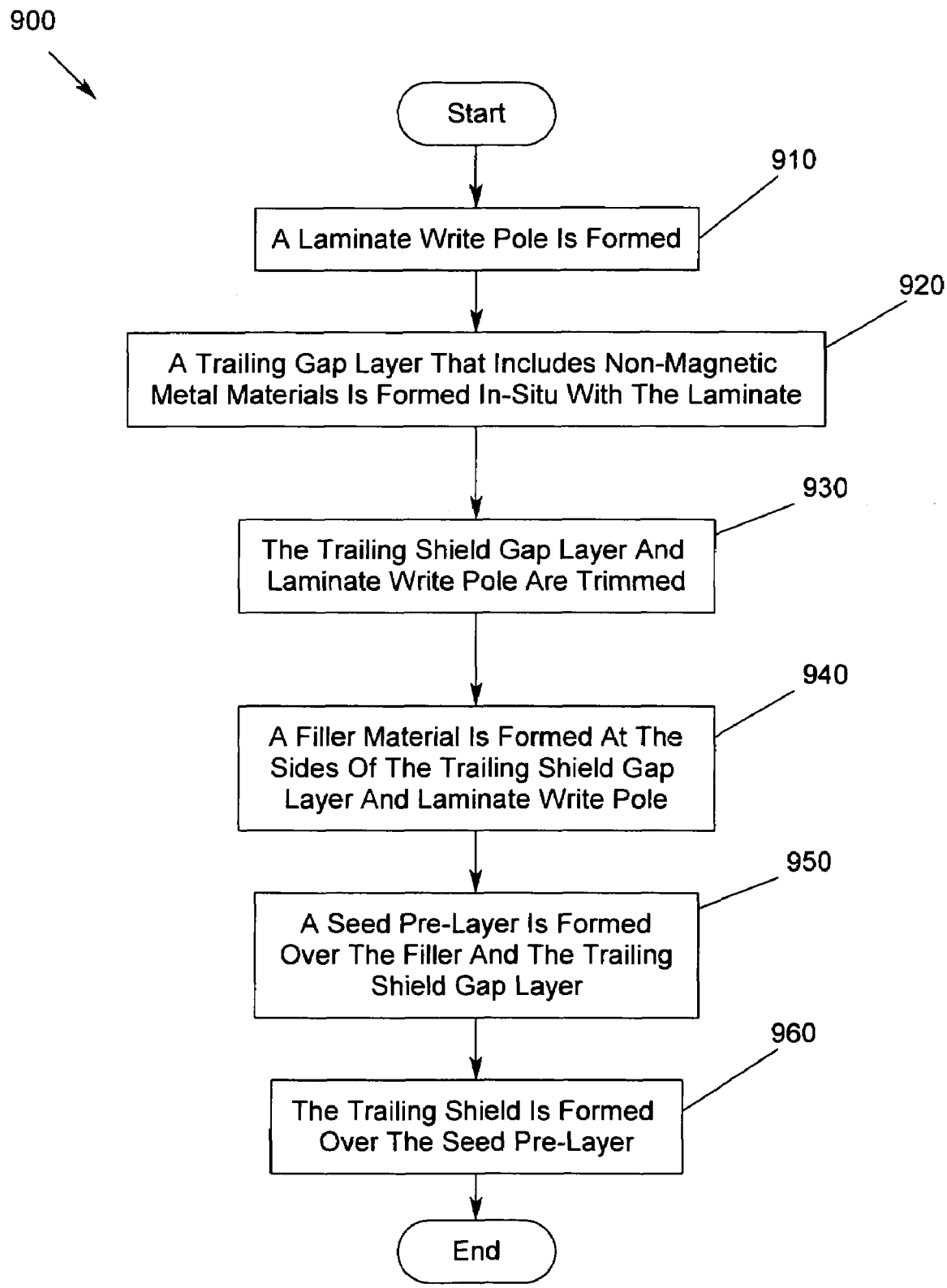
FIG. 9 is a flow chart of the method for controlling the formation of the trailing shield gap during perpendicular head fabrication according to an embodiment of the present invention.

FIG. 9 is a flow chart of the method for controlling the formation of the trailing shield gap during perpendicular head fabrication according to an embodiment of the present invention. In FIG. 9, a laminate write pole is formed 910. A trailing gap layer that includes non-magnetic metal materials is formed in-situ with the laminate 920. The trailing shield gap layer and laminate write pole are trimmed 930. A filler material is formed at the sides of the trailing shield gap layer and laminate write pole 940. A seed pre-layer is formed over the filler and the trailing shield gap layer 950. The trailing shield is formed over the seed pre-layer 960.

Accordingly, in-situ trailing shield gap deposition is used to remove the pre-sputter process that can damage the write pole material. Second, the process introduces a seed pre-layer on top of the trailing shield gap that absorb any non-uniformity of the trailing shield gap and controls issues resulting from the pre-sputter process originating from the trailing shield seed deposition.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for controlling the formation of a trailing shield gap during perpendicular head fabrication, comprising:

forming a trailing shield gap layer in-situ with a laminate write pole, the trailing shield gap layer including non-magnetic metal materials;

trimming both the trailing shield gap layer and the laminate write pole to configure the laminate write pole with a predetermined shape;

forming a filler material at the sides of the trimmed trailing shield gap layer and laminate write pole;

forming a seed pre-layer over the filler material, the trailing shield gap layer and the laminate write pole; and forming a trailing shield over the seed pre-layer.

2. The method of claim 1, wherein the forming a trailing shield gap layer that includes non-magnetic metal materials in-situ with the laminate write pole further comprises depositing a first layer of tantalum on the laminate, forming a layer of NiCr over the first tantalum layer; forming a second layer of tantalum on the NiCr layer; and forming a layer of NiFe over the second tantalum layer.

3. The method of claim 2, wherein the forming the first layer of tantalum further comprises forming a first layer of tantalum having a thickness of about 10 nm.

4. The method of claim 2, wherein the forming the NiCr layer further comprises forming a NiCr layer having a thickness ranging from about 20-40 nm.

5. The method of claim 2, wherein the forming the second layer of tantalum further comprises forming a second layer of tantalum having a thickness of about 10 nm.

6. The method of claim 2, wherein the forming the NiFe layer further comprises forming a NiFe layer having a thickness of up to about 10 nm.

7. The method of claim 1 wherein the forming a filler material at the sides of the trimmed trailing shield gap layer and laminate write pole further comprises forming a layer of alumina at the sides of the trimmed trailing shield gap layer and laminate write pole.

* * * * *